United States Patent [19]

Ponsioen et al.

[11] Patent Number: 5,166,860
[45] Date of Patent: Nov. 24, 1992

[54] METAL-ENCASED MODULAR MEDIUM-VOLTAGE DISTRIBUTION SYSTEM

[75] Inventors: Ysbrand P. J. M. Ponsioen, Alphen A/D Rijn; Paulus Paul, Nijmegen, both of Netherlands

[73] Assignee: Holec Systemen En Componenten B.V., Hengelo, Netherlands

[21] Appl. No.: 695,022

[22] Filed: May 6, 1991

[51] Int. Cl.$^5$ .............................................. H02B 1/20
[52] U.S. Cl. ................................... 361/341; 361/355; 361/361
[58] Field of Search .............................. 361/331–335, 361/341–342, 355, 361

[56] References Cited

U.S. PATENT DOCUMENTS

| | | | |
|---|---|---|---|
| 2,288,650 | 7/1942 | Rossman | 361/333 |
| 3,840,785 | 10/1974 | Olashaw | 361/342 |
| 5,045,968 | 9/1991 | Suzuyama et al. | 361/341 |

FOREIGN PATENT DOCUMENTS 1405925 12/1965 France.

*Primary Examiner*—Gregory D. Thompson
*Attorney, Agent, or Firm*—Watson, Cole, Grindle & Watson

[57] ABSTRACT

Metal-encased modular medium-voltage distribution system with one or more sections constructed of compartmental modules having components of the distribution system and each section having at least one first busbar system for internal section connection including n phases, each of the phases extending substantially rectilinearly in a first direction (x). At least one second busbar system with n phases for external connection to other sections, each of the phases of the second busbar system extending essentially rectilinearly in a second direction (y) substantially perpendicular to the first direction (x). First switching elements extending in a third direction (z) substantially perpendicular to both the first direction (x) and the second direction (y), and being arranged between the phases of the first busbar system and corresponding external conductors; and second switching means extending substantially in the third direction (z), and arranged between the phases of the first busbar system and corresponding phases of the second busbar system.

9 Claims, 3 Drawing Sheets

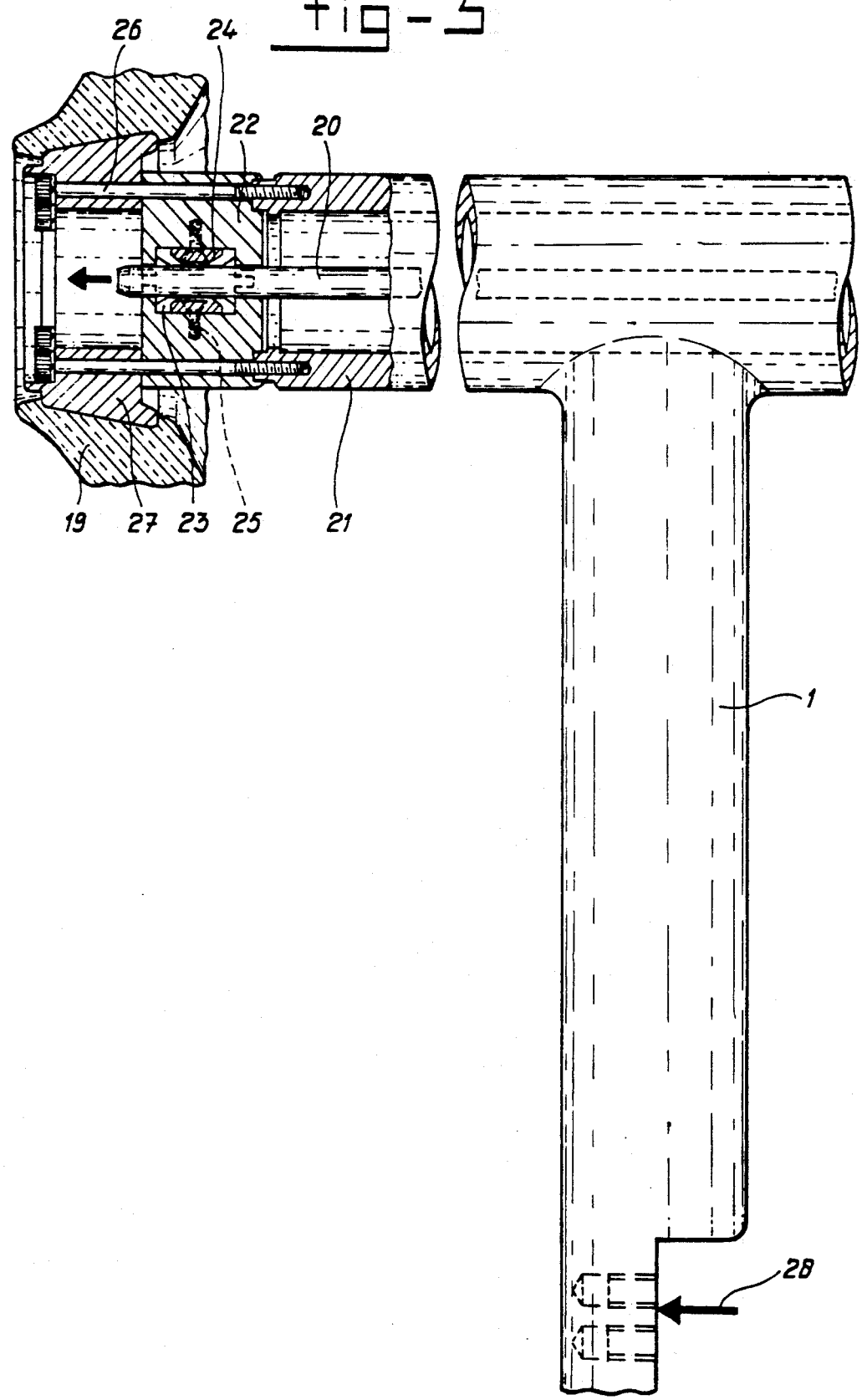

METAL-ENCASED MODULAR MEDIUM-VOLTAGE DISTRIBUTION SYSTEM

BACKGROUND OF THE INVENTION

1. Field of the Invention

The invention relates to a metal-encased modular medium-voltage distribution system comprising one or more sections constructed of compartmental modules, in which modules components of the distribution system are accommodated.

2. Related Art

Modular medium-voltage distribution systems are known which are sheet steel encased with and using $SF_6$ gas as insulating medium. Thus, such a system supplied by Calor Emag is known under the designation ZV2. The system is constructed of separate compartmental modules such as one or two busbar modules, a switch module, an actuating module, etc. The advantage of such a modular construction is that various switching schemes (section construction) requested by the customer can be realized simply. The modular construction furthermore provides a number of other advantages such as compact construction, simple possibility of expansion and constant floor area for single and double busbar designs.

Although the known modular medium-voltage systems. These offer advantages, in terms of environmental considerations it is a disadvantage that use is made of $SF_6$ as insulating medium. In addition, the insulating medium hampers the maintenance and the expansion/repair of the installation because the installation has to be consecutively degassed, drained and then refilled under specified conditions. Furthermore, the various known compartmental modules are matched to different functions and consequently are also different in shape and dimensions and therefore mutual replaceability is fairly limited.

SUMMARY OF THE INVENTION

The object of the invention is now to provide a modular medium-voltage distribution system of the type mentioned above, in which the the disadvantages of the known systems are avoided with the retention of the advantages and which is at the same time, in particular, simpler and more flexible in design.

The invention is characterized by:
- for each section at least a first busbar system extending essentially rectilinearly in the vertical direction (x) for the internal section connection;
- at least a second busbar system extending essentially rectilinearly in the horizontal direction (y) for external connection to other sections;
- switching means which extend perpendicularly to the first and second busbar system in the horizontal direction (z) and with which the first and the second busbar system respectively can be connected to each other or the first busbar system can be connected to an external connection.

The components needed for the medium-voltage distribution system and accommodated in the compartmental modules comprise, in general, switching means such as power switches and/or isolating switches with the associated drive mechanisms and actuating means and external and internal connection facilities such as cable connections and busbar systems.

By designing the distribution system as specified by the invention, the components can be sited in a relatively random way in the total system, while the internal and external connections can nevertheless be brought about in a simple way.

The section construction, that is to say the position of the cable connection, the use of a single or double busbar system etc. can therefore be chosen with complete freedom. The invention therefore provides a very flexible system which is easy to maintain, to expand or to repair.

The vertical busbar system makes possible short, direct and simple connections for both the various connections and the actuation and/or locking of the switch components, which benefits the clear arrangement and therefore safety.

The switching means usual in distribution systems are, according to the invention, inserted between the two busbar systems, the first vertical busbar system being situated, in addition, at the actuating side with respect to the switching means. As a result of this and as a result of the horizontal operating direction of the switching means, the drive mechanisms can be sited in front of the switching means and the mounting plate, on which the mechanisms are mounted and which is for that reason of heavy construction, can also serve as a barrier of the respective compartment and, as such, acts as an extra protection for the attendant personnel against any internal faults which may occur.

In addition, the actuating and locking means, and also the measuring and indicating devices can be accommodated in one housing, which is beneficial for the purpose of preventing electromagnetic interference and also for the purpose of promoting the interchangeability of the control and safety components.

By siting the isolating or power switches in the same planes as the first busbar system and the second busbar system or the external connection, short, simple and conveniently arranged connections become possible.

The simplicity and reliability can be further increased by integrating the connecting points between switches and busbars with the busbar system.

As a result of the lay-out of the distribution system according to the invention, the flexibility is further increased by designing the external connection as cable terminations which are situated either essentially in the vertical plane through the second busbar system or in a vertical plane behind it.

In order to be able to gain maximum profit from the freedom of choice offered by the invention in the section construction, the system is constructed of essentially rectangular compartmental modules of identical shape which are mirror-symmetrical with respect to the three main planes through the center of gravity. At least one plane of such a rectangular compartmental module can be provided with an insulating carrier for the components of the section system.

As a result of the above-mentioned symmetry, each compartmental module with the component contained therein can be used at any site in the system and can in turn also be replaced. As a result of the unity in dimensioning the modules, expansion of the installation is furthermore very simple to realize.

BRIEF DESCRIPTION OF THE FIGURES

The invention will now be illustrated in more detail with respect to the drawings in which exemplary embodiments are shown.

FIG. 3 shows a section through an isolating switch.

DETAILED DESCRIPTION

Figure 1:
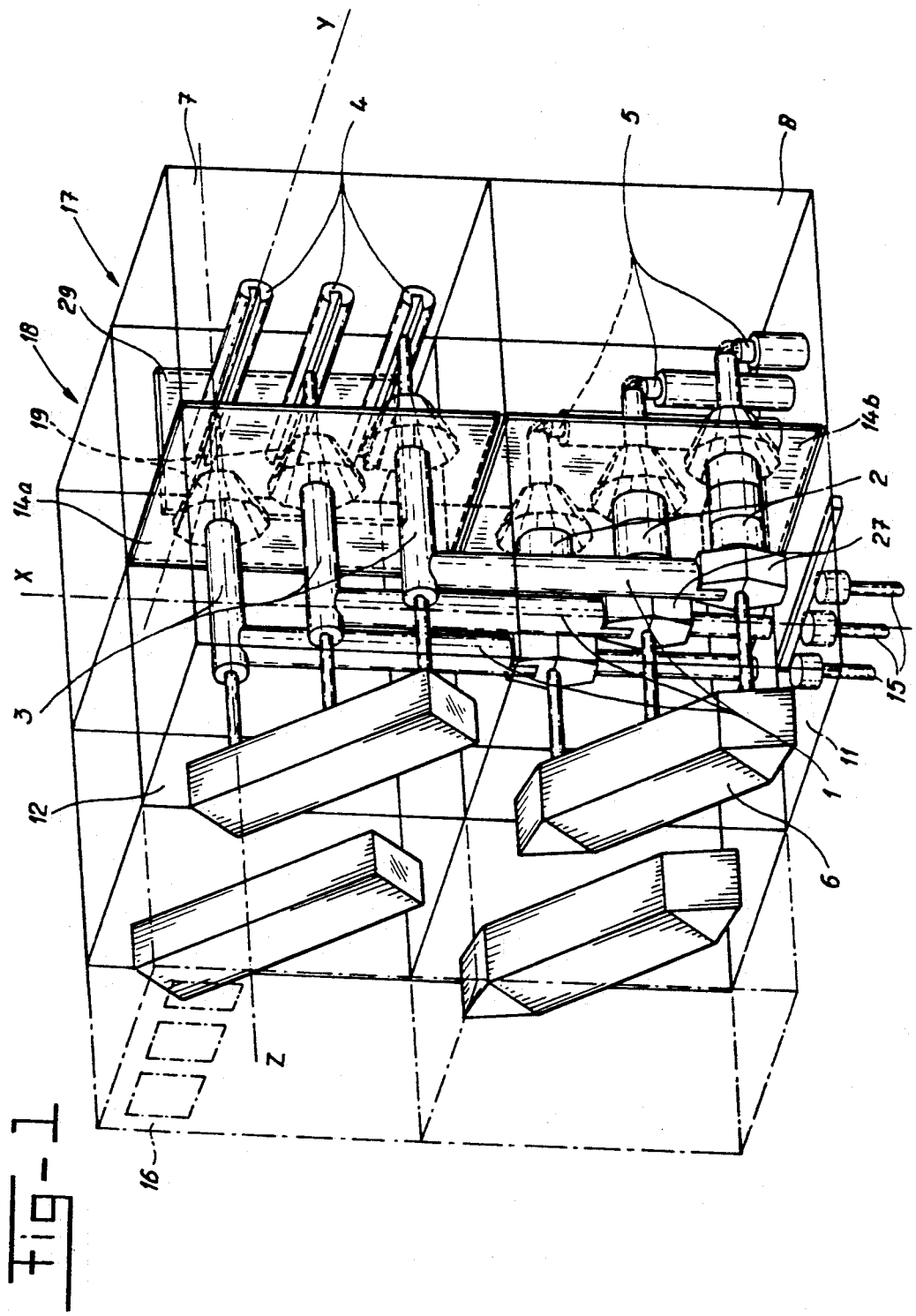
FIG. 1 shows a standard arrangement according to the invention in the case of a single busbar system.
Figure 2:
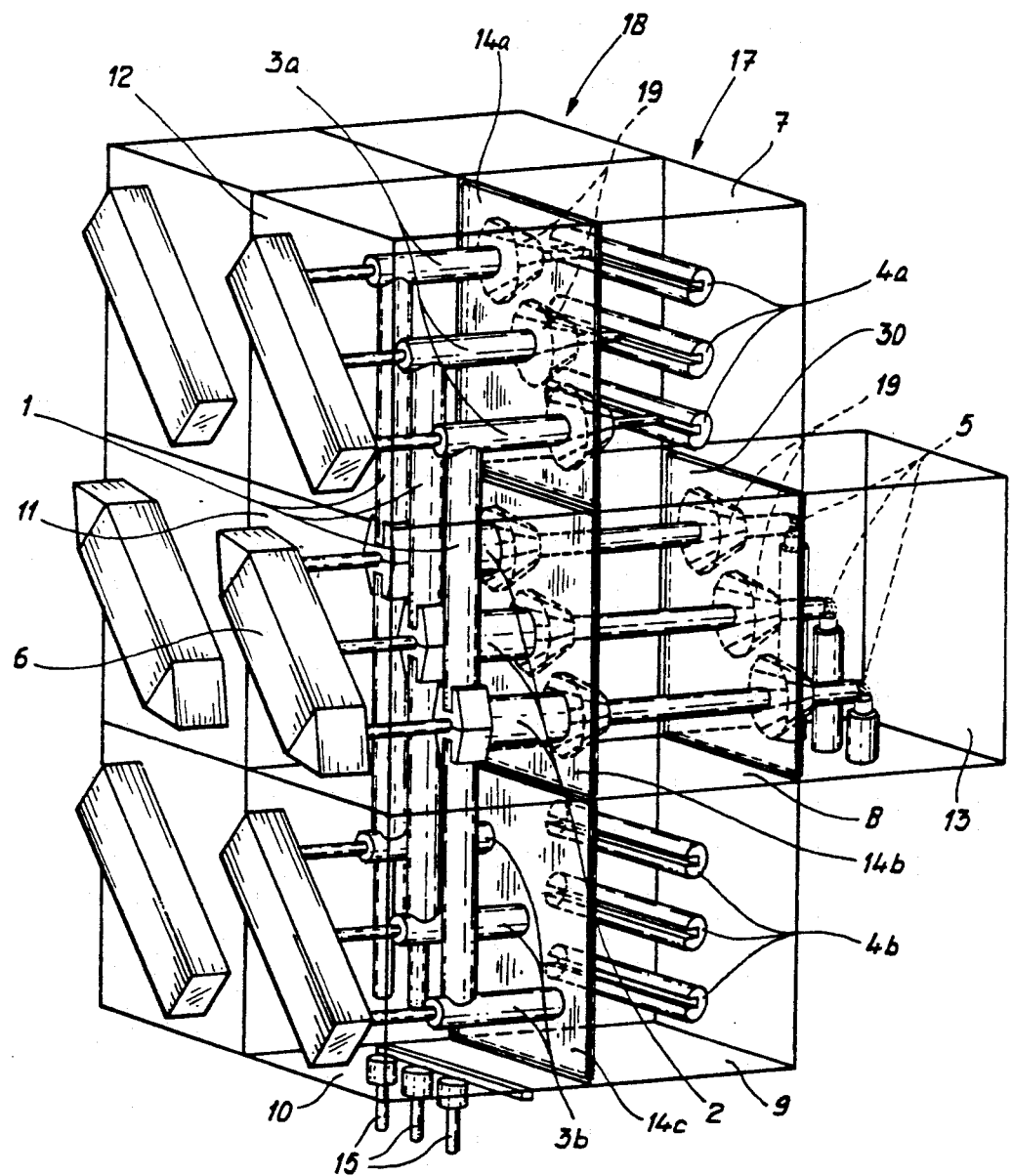
FIG. 2 shows a standard arrangement according to the invention in a double busbar system with the cable terminations between the busbar compartments.

In FIGS. 1 and 2, in which only one section 17 is shown in detail, the reference numeral 1 indicates the first, vertical three-phase busbar system which extends in the direction x. The reference numerals 2 and 3 show power switches and isolating switches respectively which extend in the horizontal direction z and are located between the first busbar system 1 and the second busbar system 4 which is situated behind it and the busbars of which extend in the horizontal direction y and are perpendicular to the direction x of the first busbar system 1. It can also be said that the phases of the first busbar system 1 and the poles of the switches 2 and 3 extend in a common vertical plane (x, z), while the phases of the second busbar system 4 and the poles of the switches 2 and 3 extend in a common horizontal plane (y, z).

The power switches 2, in this case, for example, comprising vacuum switches, extend between the first busbar system 1 and the cable terminations 5. The cable terminations extend in FIG. 1 along the above-mentioned vertical plane of the second busbar system 4. In the arrangement according to FIG. 2, said cable terminations 5 are displaced backwards with respect to the second busbar system 4.

The connecting points for the isolating switch 3 can be integrated in the first busbar system 1. This is shown diagrammatically in FIGS. 1 and 2 at the ends of the busbars of the first busbar system 1. FIG. 3 shows a more detailed section of this in the plane x–z. Here 1 indicates a vertical busbar of the first busbar system. 20 is the contact pin of the isolating switch 3 with housing 21. The contact pin 20 is supported by laminated contacts in holder 22. The laminated contacts are constructed from contact springs 23 supported by a point 24 on which a bolt 25 acts in order to press the contact springs 23 against contact pin 20. All of these are held in position with the aid of a ring 27 cast in the supporting insulator 19 and bolts 26. The bolts 26 run through the holder 22 into the housing 21 of the isolating switch 3. At 28 at the bottom right is a connecting point for a power switch 2. The contact pin 20 of the isolating switch 3 is moved to the left on connecting the busbar 1 to one of the busbars of the horizontal busbar system 4 in this FIG. 3.

The horizontal second busbar system 4 may pass through several sections. The blocks shown to the left in FIG. 1 can therefore contain similar sections with components such as vertical busbar system 1 and switches 2 and 3. The second busbar system 4 then passes through several sections 17, 18, etc. situated next to one another.

This arrangement makes the design of a medium-voltage distribution system very flexible. From the figures it is evident that the connections can be kept short and simple, which also applies to the drive and locking, the actuating means of which are situated at the front side, that is to say on the left in the figures. 6 indicates the drive device for the associated vacuum switch 2. The drive device 6 is situated in a front module in front of the module for the first vertical busbar system 1. At this side, as stated, all the other actuating devices are situated.

In FIG. 2, the lowermost isolating switches 3b are pulled out to the left so that the lowermost horizontal busbar system 4b is not connected to the first busbar system 1. At the top in FIG. 2, the isolating switches 3a connect the vertical busbar system 1 to the uppermost horizontal busbar system 4.

As a result of the arrangement according to the invention in which the various parts all extend in the directions x, y and z, compartmental modules can be used which have the same embodiment, with passage openings at predetermined points and which can be placed on and next to one another in a matching manner and in matching directions as regards the passage openings.

This compartmentalization is shown in FIGS. 1 and 2 by bold lines, the reference numerals 7 to 13 inclusive respectively in the section 17. The compartments 7 to 13 inclusive may, for example, comprise rectangular frames each having identical dimensions and having one or more closeable side walls. In the embodiment according to FIGS. 1 and 2, a part of the uppermost horizontal busbar system 4 or 4a is situated in compartment 7 at the top right. Connecting busbars between the vacuum switches and the cable terminations 5 extend through compartment 8. A part of the lowermost horizontal busbar system 4b again runs in compartment 9 in FIG. 2. Compartment 10 contains the grounding system 15.

A part of the first vertical busbar system 1 with the isolating switches 3 (FIG. 1) or 3a (FIG. 2) runs in the left-hand top compartment 12. Compartments 11 and 12 contain the continuous parts of the first busbar system 1 and compartment 11 the vacuum switches 2, which connect said first busbar system to the cable terminations 5 in the compartments 8 and 13. Finally, the compartment 10 at the bottom left in FIG. 2 contains the lowermost parts of the first vertical busbar system 1 and the isolating switches 3b which are able to connect the busbar system to the lowermost horizontal busbar system 4b.

The reference numerals 14a, b, c indicate insulating cover plates between, respectively, the compartments 7 and 12, 8 and 11, and also 9 and 10, which plates also serve to support the insulating switch 3 or 3a, b, the power switch 2 and the horizontal busbar system 4b. In, for example, compartment 7, a further insulating plate 29 can be provided, with the aid of which the uppermost second busbar system 4 is supported (FIG. 1). The busbars of the vertical first busbar system 1 can be supported by the various switches 2 and 3 which are held in their position by the insulating plates 14a, b. 19 is a supporting-insulator which forms part of the insulating cover plate 14a, b, c or 30 (FIG. 2). In FIG. 2, the supporting-insulators between the compartments 9 and 10 have been omitted for the sake of clarity.

The open sides of the various compartments provide the necessary space for easily constructing, for each field, the connections between the components in the horizontal direction. Obviously, other insulating and metal plates can also be fitted in these openings for mechanical reinforcement and for a further protection.

Between the attendant and the various components such as the switches, the busbar systems, etc. are the front actuating modules indicated by 16 in FIG. 1. These contain the drive mechanisms, the locks, etc. for the switches, measuring and safety equipment etc. The dimensions in the z direction can, if desired, be matched to the dimensions of the components to be covered or may be otherwise suitably chosen. The front modules 16 cover the components which are supported per se by the mounting plate of the drive 6 of a power or isolating switch. The front modules do not therefore have to meet stringent mechanical requirements and they can be manufactured, for example, from plastic. The front modules have the same dimensions in the x, y direction as the compartmental modules 7–12.

It is obvious that the invention is not limited to the distribution systems shown in FIGS. 1 and 2. The various components and busbars may also be grouped mutually in a different way. By making use of three directions x, y and z which are perpendicular to one another, a very simple modular construction always remains, however, possible, any system being capable of being assembled by extremely simple means. The entire system could also be supported by a single vertical wall which then contains the insulating plates 14a, b, c. From the point of view of safety, production, flexibility and the like, however, preference is given to compartmental modules which separate the components better from one another, as a result of which a greater protection is also obtained but which can be of identical shape because of the x-y-z construction.

We claim:

1. Metal-encased modular medium-voltage distribution system, comprising:

a plurality of sections constructed of compartmental modules comprising components of said distribution system; each said section comprising at least one first busbar system for internal section connection including n phases, each of said phases extending substantially rectilinearly in a first direction (x);

at least one second busbar system comprising n phases for external connection to other sections, each of said phases of the second busbar system extending essentially rectilinearly in a second direction (y) substantially perpendicular to said first direction (x);

first switching means extending in a third direction (z) substantially perpendicular to both said first direction (x) and said second direction (y), and being connected between said phases of said first busbar system and corresponding external conductors; and second switching means extending substantially in said third direction (z), and connected between said phases of said first busbar system and corresponding phases of said second busbar system.

2. Distribution system according to claim 1, further comprising driving means for driving said first and second switching means, said driving means being supported by a plate mounted between said driving means and said first and second switching means.

3. Distribution system according to claim 1, wherein said first switching means are power switches and said second switching means are isolating switches.

4. Distribution system according to claim 1, wherein all of said n phases of said second busbar system extend parallel to one another in a first vertical plane (x, y) and each of said external conductors extend in said first direction (x), as well as in said first vertical plane.

5. Distribution system according to claim 1, wherein all of said n phases of said second busbar system extend parallel to one another in a first vertical plane (x, y) and each of said external conductors extend in said first direction (x), as well as in a second vertical plane substantially parallel to, but not coinciding with, said first vertical plane.

6. Distribution system according to claim 1, further comprising isolating switches integrally connected to said first busbar system.

7. Distribution system according to claim 1, further comprising grounding devices integrated with the first busbar system and situated in a third vertical plane for grounding the system, said third vertical plane being parallel to said first vertical plane and also comprising each of said first busbar system.

8. Distribution system according to claim 1, wherein said compartmental modules are rectangular of identical shape.

9. Distribution system according to claim 1, wherein said components in each compartmental module are supported by insulators mounted in side walls of said compartmental modules.

* * * * *